United States Patent [19]

Gittner et al.

[11] Patent Number: 5,326,258
[45] Date of Patent: Jul. 5, 1994

[54] METHOD AND APPARATUS FOR HEATING PREFORM BLANKS COMPOSED OF PARTLY CRYSTALLINE SYNTHETIC RESINS PRODUCED BY INJECTION MOLDING

[75] Inventors: Franz Gittner, Soltendieck; Uwe-Volker Roos, Bodenteich, both of Fed. Rep. of Germany

[73] Assignee: Bekum Maschinenfabriken GmbH, Fed. Rep. of Germany

[21] Appl. No.: 45,100

[22] Filed: Apr. 12, 1993

[30] Foreign Application Priority Data

Apr. 11, 1992 [DE] Fed. Rep. of Germany ....... 4212248

[51] Int. Cl.⁵ .............................................. F27D 7/00
[52] U.S. Cl. ........................................ 432/5; 34/62; 432/77; 432/225
[58] Field of Search ............... 34/1 W, 13, 18, 39, 34/40, 62, 68; 432/5, 6, 9, 10, 77, 78, 147, 224, 225, 229; 165/61, 65

[56] References Cited

U.S. PATENT DOCUMENTS

| | | |
|---|---|---|
| 2,952,078 | 9/1960 | Litzler ................................ 34/68 |
| 3,525,163 | 8/1970 | Boylan et al. ...................... 34/13 |
| 4,652,278 | 3/1987 | Oliker ............................. 34/62 X |
| 5,099,586 | 3/1992 | Anderson ...................... 34/1 W X |
| 5,147,083 | 9/1992 | Halstead et al. ............... 432/77 X |

Primary Examiner—William E. Tapolcai
Attorney, Agent, or Firm—P. L. Albright

[57] ABSTRACT

A process and apparatus for heating injected, cold preform blanks composed of partly crystalline synthetic resins which have been produced by injection molding. The preform blanks are positioned in holders on a conveyor and are rotated about their longitudinal axes as they are moved along the conveyor, heated to blow mold temperature in multiple stages including a series of heating and cooling stations on respective opposite sides of the conveyor so as to be heated from one side of the conveyor and cooled from the other side while being carried on the conveyor and while being simultaneously rotated whereby they are uniformally heated across their cross sections. The process is completed by tempering and producing a protective surface on the preform blanks before they are supplied to a blow molding device. The entire process requires only several minutes of time.

14 Claims, 2 Drawing Sheets

METHOD AND APPARATUS FOR HEATING PREFORM BLANKS COMPOSED OF PARTLY CRYSTALLINE SYNTHETIC RESINS PRODUCED BY INJECTION MOLDING

FIELD OF THE INVENTION

The present invention relates to a method and apparatus for heating preform blanks which are composed of partly crystalline synthetic resins produced by injection molding. Specifically, the present invention provides a series of simultaneous heating and cooling steps combined with temperature equalizing steps followed by a tempering process to prepare a preformed blank, composed of either synthetic resins partly crystalline synthetic resins or multilayer materials, for blow molding.

BACKGROUND OF THE INVENT/ON

Synthetic resins are currently used to produce many different products. Among them are bottles, cans, drums, tanks, and toys.

One method for processing synthetic resins is the "extrusionblow method". In such method, the processing occurs while the workpiece is in a heated state. Typically, a tube is pressed out of a blowing head and subsequently divided into preform blanks which are transferred, while in a plastically deformable state, into a blow mold where they are blown into completed hollow bodies.

Alternatively, the "reheat process" may be used to produce an end product from a preform blank. In this process preform blanks which have been produced by direct injection molding are cooled and then placed in storage. Subsequently, they are removed from storage and reheated prior to blow mold processing. The present invention is directed to a novel reheat process.

The reheat process has many advantages over the extrusion-blow method. The structural characteristics of the preform blanks created during the injection process are preserved by the rapid cooling which occurs following the injection molding of the work material. These beneficial structural conditions can be further improved by reheating, mechanical working and blow molding. The resulting structural properties improve the end product's droprupture resistance, cold-rupture resistance as well as its visual transparency.

Another advantage of using the reheat process is when hollow bodies are produced that have filling and emptying openings, such as bottles, flasks, containers, canisters or the like, the area to be shaped for the sealing can be precisely shaped during the initial injection molding process and does not need to be again shaped during the blow molding process. This is particularly important when producing threaded surfaces. As a result of this feature, the blow molding time can be reduced because the neck area contains the largest cross section of the hollow body, and if shaped in a blow mold apparatus, it requires a significantly longer period of time to cool than the rest of the hollow body.

In the reheat method, preformed blanks which have been typically formed by injection molding are removed from storage and reheated to the desired blow molding temperature. This is normally accomplished by conveying the blanks along an infrared radiating system which heats the preform blanks to a uniform temperature including the temperature of the material within the transverse cross sections.

A major challenge involves the heating of the preform blank uniformly throughout its entire cross section. The preform blank is continuously or intermittently heated while being conveyed and at the same time while being rotated about its longitudinal axis. The preform blank is, however, only exposed to radiant heat on its outside surface and a temperature gradient is produced through its cross section. When the preform blank is blow molded axial stretching typically occurs. If the temperature through the material of the preform blank is not substantially the same, the end result is the production of a hollow body having certain undesirable qualities. The inside surface of the preform blank is structurally different than the outside which was formed at a greater temperature than the inside. When the inner portions of the preform blank are deformed during the blow molding process while the temperature of such portions is relatively low, stress distortions are usually created therein which have a negative influence on the strength and the appearance of the resulting hollow body.

According to European Patent No. 387 737 A1, a satisfactory uniform heating of a preform blank can be provided within a relatively short period of time. According to that method, the preform blanks are heating to avoid recrystallization at a temperature that is lower than the blow molding temperature. They are subsequently cooled, and then reheated to a temperature slightly above the blow molding temperature. Thereafter, the temperature of the preform blanks is allowed to equalize or, in any event, to decrease slightly prior to blow molding.

This method is not suitable, however, for certain desirable processes. Not all plastic materials of the group of partly crystalline polymers, respond favorably to the method. An outstanding representative from the group of partly crystalline polymers, is polypropylene. Polypropylene has many desirable qualities. These include: a very high rupture resistance, high drop values, excellent transparency and a thirty percent lower specific weight relative to other synthetic resins. (e.g. polyethylene terephthalate). Furthermore, polypropylene is available at approximately one-half the cost of other synthetic resins. Yet further, compounds which are made of polypropylene are suitable for filling with hot products. Still further, the polypropylene containers as well as their contents can be sterilized after they have been filled. This can be important, for example, for medicines and products such as blood plasma.

Partly crystalline synthetic resins such as polypropylene are extremely difficult to process due to their narrow "processing window". The "processing window" is severely restricted by the limited temperature range in which partly crystalline synthetic resins can be suitably processed to produce the favorable properties described above. Polypropylene, for example, has a very specific optimum processing temperature which must be maintained within a range of ±1 degree Celsius.

Another reason for the difficulty in processing polypropylene relates to its composition. Polypropylene does not contain free hydrogen molecules. When materials having free hydrogen molecules are heated, they tend to vibrate which assists in the attainment of a uniform temperature distribution within such materials. In contrast, when processing polypropylene, nearly all of the total heat must be applied along the length and through the cross section of the preform blanks by conduction, as such, without the benefit conferred by the free hydrogen molecules.

A method which has been used to heat polypropylene preform blanks in a uniform fashion is known as the "Hercules Method". With this method, the polypropylene preform blanks are exposed to slow, careful heating during a long period of time and over a relatively long distance of their movement on a conveyor. This method attempts to arrive at the desired uniform temperature in cross section of the preform blanks by continuously heating the blanks over a relatively long time duration. Typically, in the Hercules Method the preform blanks are heated for long as a thirty minutes time period. During most of this period, the temperature of the material throughout the cross-section of the preform blanks is being equalized.

The Hercules Method has serious drawbacks. When molding or heating work products, periods of shutdown are inevitable. Shutdown times can occur both intentionally as well as for reasons which are beyond of the control of the operator. When shutdowns occur with the Hercules Method, preform blanks which remain in the oven are often overly heated whereby they become unusable rejects.

For the foregoing reasons, there is a need for a reheat method which can be successfully used to process synthetic resins including, in particular, partly crystalline synthetic resins such as polypropylene. But, such reheat method should also be capable of processing preform blanks of multiple layers of different materials which can contain both partly crystalline as well as amorphous materials. Furthermore, it is advantageous for the reheat method to have the required treatment time substantially reduced-preferably to only a very few minutes, for example, a five minute total processing time would be ideal.

SUMMARY OF THE INVENTION

An important object of the present invention is to provide a reheat method for processing synthetic resins as well as a wide range of partly crystalline synthetic resins, especially polypropylene in all of its different forms. A further important object of the invention is to process preformblanks of multilayer materials which can be composed of both partly crystalline and amorphous material.

Another object of the present invention is to provide a reheat method for synthetic resins as well as partly crystalline synthetic resins in which the total temperature treating time is approximately five minutes.

According to the present invention, the preform blanks are positioned on holder mandrels which are connected to a conveyer chain. The preform blanks are rotated while being carried by the conveyor chain and transported along an equalizing section wherein the temperature of the preform blanks, as received initially on the conveyor chain, is uniformly equalized throughout. The preform blanks are then transported along a heating/cooling station which provides alternating heating/cooling and temperature equalizing stages. The preform blanks have their temperature increased to the blow molding temperature as they are transported along the heating/cooling station. At the end of this station, temperature is uniformly distributed considered both along the lengths of the preform blanks and through their cross sections. The preform blanks are next transported into a surface treatment and tempering station which stabilizes the condition of the preform blanks produced in the heating and cooling station, thereby ensuring the complete temperature equalization throughout their cross sections.

The present invention may incorporate multiple production lines wherein two closely adjacent conveyor lines of preform blanks are similarly treated and subsequently processed by a blow molding apparatus to form the desired hollow bodies. The preform blanks which are used can either be identical or different with respect to size and/or configuration on each production line.

According to the present invention, an initial equalizing station is provided at the beginning of the production line. The preform blanks are rotated about their vertical axes as they are conveyed along this equalizing station prior to being introduced to the heating/cooling station.

The preform blanks are rotated about their vertical axes throughout the entire process. In this manner, even the smallest adverse temperature differential is avoided whereby a substantially uniform temperature is achieved about the periphery of the preform blanks. The automatic rotation of the preform blanks is adjustable to provide a wide range of angular velocities depending upon the sizes and shapes of the preform blanks.

When there are multiple production lines, each production line may have its own rotational drive. Furthermore, the direction of rotation of the preform blanks coincides with the direction of movement of the conveyer chain.

Various mechanisms for rotating the preform blanks are known in the art. Similar mechanisms may also, however, be adapted for this purpose. For example, attention is invited to the following U.S. Pat. No. 2,519,177 to Chenault of Aug. 15, 1950; U.S. Pat. No. 2,508,259 to Helme of May 16, 1950; U.S. Pat. No. 4,171,041 to Lowe of Oct. 16, 1979; and U.S. Pat. No. 4,832,173 to Hattori et al of May 23, 1989.

In the heating/cooling station, heat blocks are provided in which infrared quartz radiator rods may be selectively mounted either in horizontal or vertical dispositions. The quantity of the infrared quartz radiator rods may also be varied depending on the size and shape of the preform blanks being processed. Furthermore, the orientation of the infrared quartz radiator rods may be varied in each heat block, wherein either vertical or horizontal infrared quartz radiator rods may be installed.

The temperature output and rod distribution of the each heat block may thus be varied considerably by modifying the quantity and orientation of the heat rods.

According to the present invention, while the rotating preform blanks travel one after the other past the heat blocks, the preform blanks are being heated on one side (outboard side of the conveyor chains) and are simultaneously being cooled on the opposite side (inboard side of the conveyor chains). Reflectors are positioned on the inboard side of the conveyor chains opposite the heat blocks. The reflectors are connected to a source of temperature regulated air and provide outlets for cooled air which impinges on the perform blanks as they are conveyed past the reflectors, and the degree that the preform blanks are cooled can be regulated. This cooled air functions both to cool the reflectors and to prevent the outside surfaces of the preform blanks from being overheating. The air cooling is provided through the reflectors via apertures, slots or any other suitable perforations provided therethrough.

An important feature of the present invention is that the rotating preform blanks are heated from the radiant heat source on one side of the conveyor while being simultaneously cooled by air emitted on the other side. This process successfully increases the temperature of the entire cross section of the rotation preform blanks precisely to their predetermined blow mold temperature, without overheating, the polypropylene being extremely sensitive to overheating. As an individual sector the cross section of a preform blank presents itself for heating during one pass of its rotation, it receives the heat radiating from the heat rods of the heat blocks at the beginning of its first rotation whereby that surface sector is heated first. Subsequently, as the preform blank continues to be rotated, temperature increases of the blank caused by heat radiation from the heat rods are continuously attenuated in a step-like fashion by the air cooling. Thus, the increasing temperature of the preform blank's material is, in effect, being modulated by the air cooling which occurs on each rotation of the preform blank. The same sector when continuously rotated sustains small thermal increments of temperature increases caused by the cooling and the heat radiation alternately imposed on it. This process, gradually and uniformly, raises the overall temperature of the preform blank. The increased temperatures so obtained are not concentrated on the outside surfaces of the preform blanks, but instead the temperature increases slowly and effectively penetrate into the blank's cross section and are thus received in a manner so that the temperature remains roughly equalized throughout the preform blank material as the process continues.

The thermal energy which is transmitted to the preformblanks through the heat blocks is distributed throughout the components of the system and acts on the preform blanks via: transmission of the thermal energy which penetrates without affecting the surface of the blank; absorption of the thermal energy which is transmitted to the interior of the blank; and conduction of thermal energy radiated to the surface of the blank. The transmission of thermal energy to penetrate the partly crystalline materials such as polypropylene and polyethylene when processed in accordance with this invention is practically zero. Thermal energy due to conduction received by the blanks, is greater than that due to the absorption. In other words, most of the thermal energy received by the preform blanks is provided by radiation thereto and thermal conduction therein. Therefore, a certain length of time is required for its interior temperature of the synthetic resin to be increased to desired temperature. The cooling air provided according to the present invention avoids an undesirably high temperature from occurring on the preform blank's surface and the thermal conduction increases the temperature of the material in increments without it being increasing unduly on its surface.

The final stage of the method according to the present invention includes a surface treating and tempering chamber wherein heated air is circulated within an enclosed space. The chamber includes a substantially enclosed volume wherefrom air can escape only through the inlet and outlet passages for receiving and discharging the preform blanks. A heated air supply is provided to circulate air within the surface treating and tempering chamber and to direct air proximate the outside surfaces of the preform blanks. The volume and other relevant physical parameters of such circulating air are adjustable to the extent required and desirable. The temperature of the chamber may be modified, as desired, according to the volume and temperature of the circulating air provided. An air exhaust is not necessary because sufficient air is vented from the inlets and outlets for the preform blanks to serve the same purpose.

According to the present invention, the combination of heating the preform blanks with the infrared heat blocks at intervals while simultaneously cooling the preform blanks as they are rotated from the side opposite the heat radiation sources combined with equalizing stages located between the heating stages and supplemented same with the surface treatment and tempering chamber, makes it possible to achieve the precise predetermined blow mold temperature within a very short period of time. It is not uncommon, for example, to achieve the exact desired blow mold temperature in five minutes. Additionally, the distribution of the desired blow mold temperature is uniform throughout the entire preform blank, that is, throughout its total cross section.

The combination of the infrared heating with the equalizing stages and the surface treating and tempering chamber serves both to protect the preform blanks against damaging environmental influences as well as to guarantee an equalized temperature in the preform blanks. The substantially enclosed volume of the surface treatment and tempering chamber further contributes to the uniform distribution of heat content of the preform blanks without undue dissipation of thermal energy into the environment.

It is always possible that an apparatus which utilizes a conveyor chain can unintentionally or otherwise be brought to a stop. But even if the heating devices are disconnected immediately, the preformblanks may still be overheated by the heat that has built up within the heating apparatus. This damages the preform blanks. However, with the present invention, the independent regulation of the rotational velocity of the preform blanks irrespective of the forward velocity of the conveyor chain in combination with air cooling of the preform blank prevents the preform blanks for being damaged.

A suitable cooling system is provided in the present invention for cooling the returning portion of the conveyor chain, but is not otherwise described as being well within the skill of the art.

Attention is invited to an earlier U.S. Patent which is considered relevant to the instant invention and is therefore incorporated by reference: U.S. Pat. No. 5,066,222 of Nov. 19, 1991.

For a better appreciation of the present invention, and to understand how it may be carried into effect, reference is now made to the accompanying drawing, in which:

DESCRIPTION OF THE PREFERRED EMBODIMENT

Figure 1:
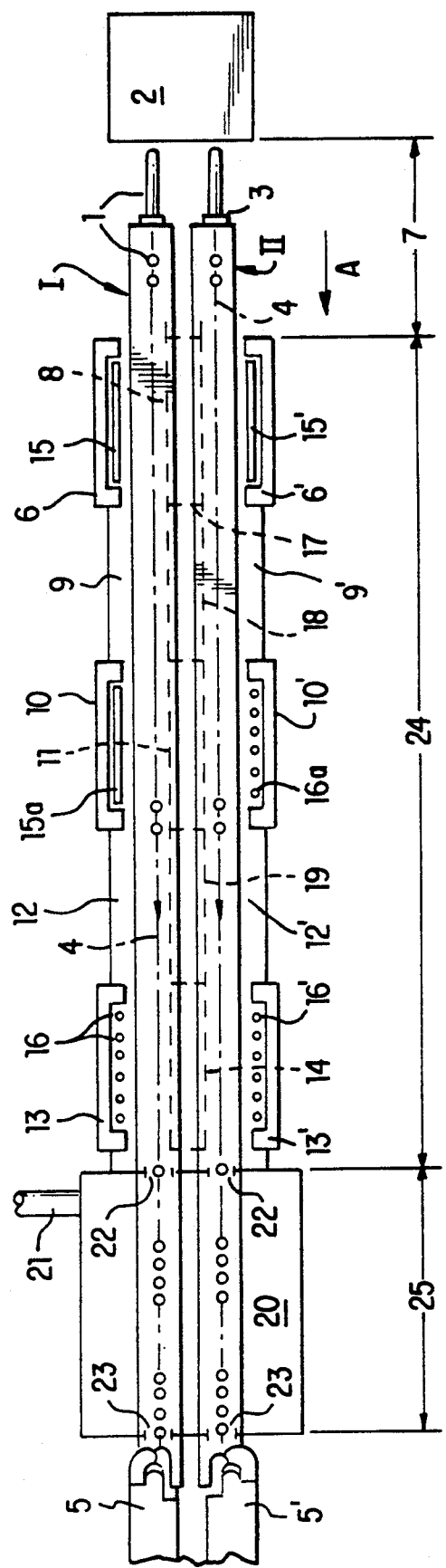
FIG. 1 is a plan view which illustrates the reheat blow molding device with two conveyor chains, three heating stages, two equalizing sections and a surface treatment and tempering chamber in accordance with the invention.

Referring to the FIG. 1 which illustrates the method and apparatus of the present invention, dual production lines I and II are shown in which two adjacent production lines of preform blanks 1 are heated one after the other and subsequently processed to form hollow bodies.

Preform blanks 1 which normally have been produced by injection molding and then placed in storage are introduced to the production lines I and II via a supply line 2. Preform blanks 1 from supply line 2 are engaged to be received by holder mandrels 3. Typically there is equal spacing between individual holder mandrels 3 which are mounted to conveyor chains 4, indicated in the Figure by dot-dash lines. Conveyor chains 4 move in the direction of the arrow A transporting the preform blanks 1 toward the tongue members 5 and 5', which receive preform blanks 1 after being heat treated on production lines I and II. Tongue members 5 and 5' remove the preform blanks 1 from production lines I and II and feed them into a blow molding apparatus (not shown). Holder mandrels 3 which support preform blanks 1 are continuously rotated, thereby rotating preform blanks 1 about their longitudinal axes as they are transported along the paths defined by conveyor chains 4.

Figure 2:
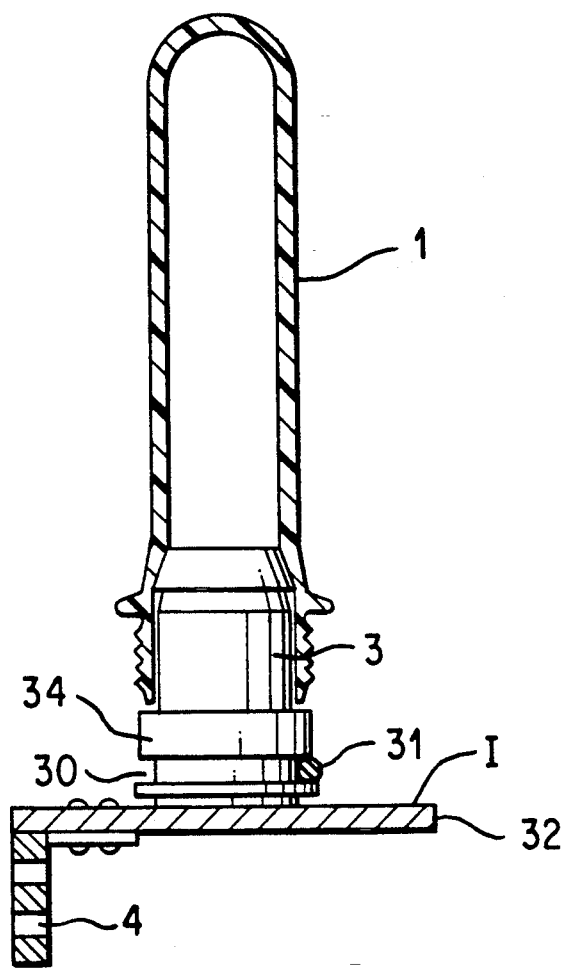
FIG. 2 is a side elevation in cross-section of a preform mounted on a mandrel extending from a belt connected to a chain drive which discloses apparatus for rotating preforms while they are being conveyed through the above stages, sections and chamber.

Referring to FIG. 2, a holder or mandrel 3 for preform 1 is rotated by a driving belt 31 which engages a groove 30 of part 34 of mandrel 3. As shown in FIG. 2, the production line I comprises a belt 32 to which is secured the conveyor chain 4.

Driving belt 31, if moving faster than belt 32, causes the preform 1 to rotate counterclockwise. If belt 31 is travelling slower than belt 32 or is stopped or is moving in the opposite direction, then the preform 1 is rotated in a clockwise direction. Driving belt 31 engages groove 30 frictionally to rotate the mandrel 3 and preform 1. An appropriate mechanism, not shown, is utilized to move the belt 31 in the direction and at the velocity desired.

Preform blanks 1 are initially transported along a preliminary station 7 wherein they are rotated about their vertical axes and their temperatures are allowed to equalize.

After the preform blanks 1 have been transported through the preliminary station 7 they are introduced to the heating and cooling station 24. Station 24 typically comprises a series of heating/cooling and equalizing stages. In the embodiment shown, these stages comprise three heating blocks and two equalizing sections on each of production lines I and II. On production line I, the heating blocks are identified by reference numerals 6, 10 and 13 whereas the equalizing sections are designated by reference numerals as 9 and 12. On production line II the heating blocks are 6', 10' and 13' and the equalizing sections are 9' and 12'.

Heating blocks 6, 6', 10, 10', 13, and 13' which are respectively positioned on opposite sides of production lines I and II from a plurality of reflectors 8, 11 and 14 may be fitted with horizontal or vertical infrared quartz radiator rods. In the embodiment illustrated, heating blocks 6, 6' and 10' have horizontally arranged heat rods 15. 15' and 15a respectively. Heating blocks 10', 13 and 13' are provided with vertically arranged heat rods 16a, 16 and 16', respectively.

The orientation of the heat rods relative to the heating blocks and conveyor chain may be either vertical or horizontal (or both with inset mountings to accommodate two sets of rods). Furthermore, the quantity of heat rods to be installed in each of the heating blocks may be selectively modified so as to finely hone the resulting output temperature.

The heating block of the invention can also be selectively elevated or lowered and the spacing between them can be adjusted by various mechanisms for such purposes which are known and well within the skill of the art.

Although middle station 24, which includes heating blocks 10, 10' and heat rods 15a, 16a, is illustrated with both horizontal and vertical orientations of the heat rods, the orientations are illustrative. They may be modified depending on the desired heat output in consideration of the size and shape of the work product being processed.

Reflectors 8, 11 and 14 are air cooled. Similarly, two sets of interim reflectors 18 and 19 are also provided with air cooling. The air cooling is connected to a source of cooled air and the flow of the cooled air is directed generally in outboard directions therefrom through openings, apertures, slots, perforations or the like provided in the reflectors. The volume of air directed through each of the reflectors, its velocity, humidity and temperature are variables which are appropriately controlled by the apparatus so that its capacity to cool preform blanks may be adjusted.

Each of reflectors 8, 18, 11, 19 and 14 are separated one from the other by partitions. One such partition 17 is illustrated in the Figure. Partition 17 separates reflector 8 from reflector 18.

The partitions effectively create chambers whereby cooled air flowing out of the reflectors is directed towards the corresponding opposite heating blocks. Thermal energy radiated from heating blocks 6, 6', 10, 10', 13 and 13' is directed inboardly towards only those preform blanks 1 which are situated between the heat blocks and the reflectors which are positioned on the opposite side of the production line from the heat blocks involved. The partitions restrict the thermal energy which can escape from the heating stages to the equalizing stages 9 and 12. In this way, the equalizing stages 9 and 12 are more efficiently cooled so they, in turn, can cool the preform blanks 1.

After preform blanks 1 have passed through the heating and cooling station 24, they are then introduced to a surface treatment and tempering station 25. Surface treatment and tempering station 25 includes a tempering chamber 20 which encloses a nearly totally confined volume in which preform blanks 1 are tempered and provided with a strengthened surface. Heated air is injected into the surface treatment and tempering chamber 20 through the air supply line 21. The temperature and volume of that heated air which is received in chamber 20 is adjustable so that the air temperature inside of the chamber may be controlled. The bottom of the chamber is formed by the conveyor chain shroud (not shown). The bottom, protective top cover, sides and ends, substantially enclose chamber 20. Inlets 22 are provided on the end of the chamber 20 adjacent the final heating blocks 13 and 13' for each conveyor chain 4. Outlets 23 are also provided on the opposite end adjacent tongue members 5 and 5' for each conveyor chain 4. Inlets 22 and outlets 23 are dimensionally adapted to allow the preform blanks 1 to be passed therethrough into and from chamber 20. An air exhaust is not normally necessary in view of the air escaping from chamber 20 through inlets 22 and outlets 23.

In operation, preform blanks 1 are received from a source of preform blanks on supply line 2 to be mounted in controlled rotatable holder mandrels 3 and moved continuously by conveyor chains 4 while, at the same time, the preform blanks 1 are being rotated by mandrels 3. Preferably, preform blanks 1 on the upper conveyor chain 4 as seen in the FIG. 5 are rotated counterclockwise whereas preform blanks 1 on the lower conveyor chain 4 are being rotated in the opposite direction. Both the angular velocity and direction of rotation of preform blanks 1 by mandrels 3 is selectively and independently controllable. Preform blanks 1 are first moved into heating stages 6 and 6' where, at the same time, they are subjected to controlled cooling air emanating from reflectors 8 and flowing therefrom in generally outboard directions. Thus, preform blanks 1 while being continuously rotated are being heated from one side and cooled from the other. The extent of the heating and cooling is controlled so that the temperature of the preform blanks 1 is raised slowly by increments while the temperature of the surfaces of the preform blanks 1 is never permitted to be increased over a predetermined temperature.

Preform blanks 1 are continuously moved by the conveyor chains 4 while being rotated by mandrels 3 and are received in equalizing sections 9 and 9' wherein they continue to receive air, which has had its temperature controlled, through slots in reflectors 18.

Preform blanks 1 continue to move on conveyor chains 4 to the left as seen in the Figure having their temperature again increased by increments as they pass between heating blocks 10 and 10' and reflectors 11 from which air having a controlled temperature and cooling effect on the preformblanks 1 is discharged in a generally outboard directions. Preform blanks 1 then continue to pass, while still being rotated, through equalizing sections 12 and 12' including reflectors 19. These equalizing sections function generally the same as equalizing sections 9 and 9' except at higher temperatures. The preform blanks next pass through the heating/cooling stage comprising heating blocks 13 and 13' and reflectors 14 wherein their temperature is increased to, or to about, the desired temperature for blow molding and that temperature, if not reached in this last heating/cooling stage is obtained in the chamber 20 as a result of the heated air circulated therein from a heated air source 21.

Finally, when the preform blanks 1 are transferred by tongues 5 and 5' into the blow molding apparatus, they are at a uniform desired temperature throughout for the blow molding operation, considering the ultimate products. This temperature is achieved by making the proper adjustments to the apparatus as shown in FIG. 1, including the number of heat rods and their orientation in the heating blocks, the temperature, and characteristics of the cooling air provided whereby the temperatures of the preform blocks 1 are raised incrementally in small steps and the thermal energy is diffused uniformly throughout the preform blanks as their temperatures are so raised. Properly adjusted, the entire process of raising the temperature of the preform blanks 1 to the desired predetermined temperature for blow molding in the apparatus disclosed using the method described, should not be more than about five minutes. Preferably, mandrels 3 are independently rotatable so that the in the event the production line is stopped for any reason, the preforms blanks 1 can still be maintained at the same temperatures, or if desired, slowly cooled by the air emanating from the reflectors on the rotating preform blanks.

It will be appreciated by those skilled in the art that the incremental temperature differential that can be sustained by the preform blank depends upon its physical and chemical characteristics. Thus, the operator of the apparatus should adjust the apparatus so that the difference between the highest temperature attained on the surface of a vertical sector of the preform blank and the lowest temperature that occurs thereon in any given revolution of the preform blank is less than a temperature difference that, considering also the temperature gradients created across all sections of the preform blank, may adversely affect the physical and/or chemical characteristics of the preform blank.

Although we have disclosed our invention, it will be understood that it is capable of other adaptation and modifications within the spirit and scope of the following claims.

Having disclosed our invention, what we claim as new and to be secured by Letters Patent of the United States is:

1. A method for the controlled heating of cold preform blanks of partly crystalline synthetic resins, produced by an injection method which are conveyed through heating and cooling stations and subsequently are introduced to a blow molding apparatus for inflation of said preform blanks into hollow articles, the method comprising the steps of:
   a. Rotating said preform blanks while conveying them along a predetermined path whereby said preform blanks are first conveyed through a temperature equalizing section, then through a heating/cooling section, and finally through a surface treatment and tempering section;
   b. Heating said preform blanks on one side of said path and simultaneously cooling them on the opposite side of said path while continuing to convey them along said path in said heating/cooling section; and
   c. Exposing said preform blanks to heated air contained within a substantially enclosed space while continuing to convey them along said path in said surface treatment and tempering section.

2. A method for heating cold preform blanks of partly crystalline synthetic resins in accordance with claim 1 comprising rotating said preform blanks at an rpm which is independent of the linear speed of said preform blanks along said path.

3. A method for heating cold preform blanks of partly crystalline synthetic resins in accordance with claim 1 comprising raising the temperatures of said blanks incrementally by producing small net temperatures increases for each rotation of said preform blanks during step b.

4. Apparatus for heating preform blanks of partly crystalline resins comprising:
   a. At least one conveyor means for performing the function of transporting said preform blanks along a substantially straight path;
   b. A holding means for performing the function of mounting and independently rotating said preform blanks about their vertical axes;
   c. A temperature equalizing station disposed along said path whereon said preform blanks are rotated and moved along said path to a heating and cooling station, said heating and cooling station comprising heating blocks that are spaced apart along said conveyor means from each other, said heating blocks having heating elements;

d. A tempering station having an inlet and an outlet on said path, said tempering station comprising a substantially closed volume wherein heated air is circulated therein proximate to said preform blanks; and e. A gripping means for transferring said preform blanks from said conveyor means to a blow molding device.

5. Apparatus in accordance with claim 4 wherein said heating elements may be selectively positioned either vertically or horizontally in said heating blocks.

6. Apparatus in accordance with claim 4 wherein said heating elements comprise heating means for producing infrared thermal energy.

7. Apparatus in accordance with claim 4 wherein the quantity of said heating elements in said heating blocks is selectively variable.

8. Apparatus in accordance with claim 4 comprising adjustment means for selectively adjusting the elevation of said heating blocks relative to said path.

9. Apparatus in accordance with claim 4 comprising spacing means for selectively varying the distance between said heating blocks.

10. Apparatus in accordance with claim 4 wherein said heating blocks comprise mounting members for receiving heating elements in a vertical orientation relative to said path.

11. Apparatus in accordance with claim 4 wherein said heating blocks comprise fixtures for receiving said heating elements in a horizontal orientation relative to said path.

12. Apparatus in accordance with claim 4 wherein cooling air outlets directed towards said heating blocks are provided along said path opposite from the corresponding said heating blocks.

13. Apparatus in accordance with claim 4 wherein temperature equalizing stages are provided on said path between said heating blocks.

14. Apparatus in accordance with claim 4 wherein about 70 to 80% of said path comprises said heating and cooling station and about 20 to 30% of said path comprises said tempering station.

* * * * *